(12) United States Patent
Min et al.

(10) Patent No.: US 10,180,531 B2
(45) Date of Patent: Jan. 15, 2019

(54) LAMINATED OPTICAL SHEET MODULE

(71) Applicant: LMS Co., LTD, Pyeongtaek (KR)

(72) Inventors: Jee Hong Min, Seongnam (KR); Young Il Kim, Seongnam (KR); Sung Sik Cho, Suwon (KR); Woo Jong Lee, Osan (KR); Tae Jun Lee, Osan (KR); Hee Jeong Kim, Osan (KR); Joon Hwan Hwang, Seoul (KR)

(73) Assignee: LMS Co., LTD., Pyeongtaek (KR)

( * ) Notice: Subject to any disclaimer, the term of this patent is extended or adjusted under 35 U.S.C. 154(b) by 236 days.

(21) Appl. No.: 14/410,686

(22) PCT Filed: Jun. 24, 2013

(86) PCT No.: PCT/KR2013/005548
§ 371 (c)(1),
(2) Date: Dec. 23, 2014

(87) PCT Pub. No.: WO2014/003389
PCT Pub. Date: Jan. 3, 2014

(65) Prior Publication Data
US 2015/0301265 A1    Oct. 22, 2015

(30) Foreign Application Priority Data
Jun. 25, 2012  (KR) .................. 10-2012-0068063

(51) Int. Cl.
*F21V 8/00* (2006.01)
*G02B 5/04* (2006.01)
*G02F 1/1335* (2006.01)

(52) U.S. Cl.
CPC .......... *G02B 6/0053* (2013.01); *G02B 5/045* (2013.01); *G02B 6/0055* (2013.01); *G02B 6/0056* (2013.01); *G02F 2001/133607* (2013.01)

(58) Field of Classification Search
CPC .................. G02B 6/0053; G02B 5/045
See application file for complete search history.

(56) References Cited

U.S. PATENT DOCUMENTS 8,942,522 B2 * 1/2015 Edmonds ............... G02B 5/045
349/61
9,239,411 B2 * 1/2016 Zhu ........................ G02B 5/045
(Continued)

FOREIGN PATENT DOCUMENTS

CN         102053300 A     5/2011
JP         2006-513452 A   4/2006
(Continued)

*Primary Examiner* — Robert May
*Assistant Examiner* — Leah S Macchiarolo
(74) *Attorney, Agent, or Firm* — Patent Office of Dr. Chung Park

(57) ABSTRACT

A laminated optical sheet module includes: an upper optical sheet having a first structure pattern in which a first unit light collector having an inclined surface, the cross-section area of which decrease when progressing upwardly, is continuously repeated; and a lower optical sheet laminated beneath the upper optical sheet and having a second structure pattern in which a second unit light collector having an inclined surface, the cross-sectional area of which decreases when progressing upwardly, is continuously repeated. The vertical distance between the lowermost portion and the uppermost portion of the second unit collector is greater than the vertical distance between the lowermost portion and the uppermost portion of the first unit collector. The surface area of the inclined surface of the second unit collector is relatively larger than the surface area of the inclined surface of the first unit collector.

13 Claims, 11 Drawing Sheets

(56) References Cited

U.S. PATENT DOCUMENTS

| | | | | |
|---|---|---|---|---|
| 2004/0228106 | A1* | 11/2004 | Stevenson | G02B 5/045 |
| | | | | 362/627 |
| 2008/0049330 | A1* | 2/2008 | Tolbert | G02F 1/133606 |
| | | | | 359/599 |
| 2008/0259248 | A1* | 10/2008 | Shimazaki | G02B 6/0053 |
| | | | | 349/65 |
| 2010/0027294 | A1* | 2/2010 | Lee | G02B 5/045 |
| | | | | 362/620 |
| 2010/0055409 | A1* | 3/2010 | Cho | B32B 27/36 |
| | | | | 428/172 |
| 2013/0010234 | A1* | 1/2013 | Sung | G02B 5/0231 |
| | | | | 349/95 |

FOREIGN PATENT DOCUMENTS

| | | |
|---|---|---|
| JP | 2010-122386 A | 6/2010 |
| KR | 10-0898047 B1 | 5/2009 |
| KR | 10-2011-0051587 A | 5/2011 |
| KR | 10-2012-0014460 A | 2/2012 |
| KR | 10-1133637 B1 | 4/2012 |

\* cited by examiner

LAMINATED OPTICAL SHEET MODULE

CROSS-REFERENCE TO PRIOR APPLICATIONS

This application is a national Stage Patent Application of PCT International Patent Application No. PCT/KR2013/005548, filed on Jun. 24, 2013 under 35 U.S.C. § 371, which claims priority of Korean Patent Application No. 10-2012-0068063, filed on Jun. 25, 2012, which are all hereby incorporated by reference in their entirety.

TECHNICAL FIELD

The present invention relates to an optical sheet module and more particularly, to a laminated optical sheet module which is configured to maintain a size of an inclined surface, which concentrates light, at a predetermined size or larger in consideration of a region of a lower optical sheet which is bonded to an upper optical sheet.

BACKGROUND ART

A liquid crystal display device is a display device which is used for a notebook computer, a personal computer, a smart phone, or a television and a characteristic thereof is improved every year in accordance with enlargement of a demand of the liquid crystal display device.

A liquid crystal panel of a liquid crystal display device which is a non-emitting element requires a backlight unit due to its structure. The backlight unit is configured by various optical systems. Further, the backlight unit uses optical films which are periodically arranged in order to improve brightness.

FIG. 1 is a view schematically illustrating a configuration of a liquid crystal display device of the related art.

As illustrated in FIG. 1, a backlight unit 10 includes a light emitting source 1, a reflecting plate 2, a light guide plate 3, a diffuser sheet 4, a first optical sheet 5, a second optical sheet 6, and a protecting sheet 7.

The light emitting source 1 is an element which generates visible rays and as for the light emitting source 1, a light emitting diode (LED) and a cold cathode fluorescent lamp (CCFL) may be selectively used.

The light emitted from the light emitting source 1 is incident onto the light guide plate 3 to be progressed while being totally reflected inside the light guide plate 3 and light which is incident onto a surface in the light guide plate 3 at an incident angle which is smaller than a threshold angle is not totally reflected but transmitted to be emitted to an upper side and a lower side.

In this case, the reflecting plate 2 reflects the light which is emitted to the lower side to be re-incident onto the light guide plate 3 to improve optical efficiency.

The diffuser sheet 4 diffuses the light emitted through an upper surface of the light guide plate 3 to uniformize brightness and broaden a viewing angle, so that the light which passes through the diffuser sheet 4 has reduced front emission brightness.

The first optical sheet 5 is configured by a base member 5b and a structural pattern 5a to primarily concentrate and emit light which enters from the diffuser sheet 4 so as to be refracted and vertically incident thereonto.

Further, the structural pattern 5a is integrally formed on an upper surface of the base member 5b to vertically refract and emit light which is incident through the base member 5b.

The structural pattern 5a is generally formed to have a triangular cross-section and a vertical angle of the triangular shape is generally approximately 90 degrees.

The second optical sheet 6 has the same shape as the first optical sheet 5 and secondarily concentrates and emits the light which is primarily concentrated by the first optical sheet 5 in order to increase brightness thereof.

Here, the first optical sheet 5 and the second optical sheet 6 are integrally attached such that an extending direction of the structural pattern of the first optical sheet 5 and an extending direction of the structural pattern of the second optical sheet 6 perpendicularly intersect, thereby increasing the brightness.

The protecting sheet 7 is attached onto an upper surface so as to prevent surface damage to the second optical sheet 6.

However, according to the above structure, when the first optical sheet 5 and the second optical sheet 6 are bonded, an upper end of the structural pattern 5a is bonded to a lower surface of the second optical sheet 6, so that a shape is modified and a length of a cross-sectional trace is reduced and thus a region where light which is transmitted from a lower portion is actually refracted and concentrated is undesirably reduced.

As described above, when the region of the structural pattern 5a where the light is refracted and concentrated is reduced, brightness is reduced and thus a quality of the backlight unit is lowered.

DISCLOSURE

Technical Problem

The present invention has been made in an effort to solve the problem of an optical sheet module of the related art and provide an optical sheet module in which an inclined area is adjusted to reduce reduction of a light concentrating region since the light collecting area is reduced due to an inclined surface eliminated when a unit light collector formed on a lower optical sheet is bonded to an upper optical sheet.

Technical Solution

According to an aspect of the present invention, there is provided a laminated optical sheet module, including: an upper optical sheet having a first structural pattern in which first light collectors each having an inclined surface, a cross-sectional area of which decreases when progressing toward an upper portion, are continuously repeated; and a lower optical sheet laminated beneath the upper optical sheet and having a second structural pattern in which second unit light collectors having an inclined surface, a cross-sectional area of which decreases when progressing toward an upper portion, are continuously repeated, in which a vertical distance between a lowermost portion and an uppermost portion of the second unit light collector is longer than a vertical distance between a lowermost portion and an uppermost portion of the first unit light collector and a surface area of the inclined surface of the second unit light collector is relatively larger than a surface area of the inclined surface of the first unit light collector.

Further, an inclined angle of a cross-sectional trace of the second unit light collector may be the same as an inclined angle of a cross-sectional trace of the first unit light collector.

The second unit light collector may include a light transmitting unit which concentrates incident light and transmits the light to an upper portion; and a bonding unit which is connected to the upper portion of the light transmitting unit and is bonded to the upper optical sheet.

A length of a cross-sectional trace of the light transmitting unit of the second unit light collector may be equal to or larger than a length of a cross-sectional trace of the first unit light collector.

Further, the bonding unit may be modified during a process of bonding the second unit light collector and the upper optical sheet.

Further, the light transmitting unit may be bonded to the upper optical sheet while maintaining the length of the cross-sectional trace without modifying the shape thereof.

Further, the bonding unit may be configured to include a pair of extending surfaces upwardly extending in an upper portion of the light transmitting and a bonded surface whose both sides are connected to the pair of extending surfaces to be bonded to the upper optical sheet.

Here, the bonded surface may be formed to have a curved cross-sectional trace.

Further, the bonding unit may be formed to be a connecting surface connecting an upward end of the cross-sectional trace of the light transmitting unit.

Furthermore, an upward end of the second structural pattern may be directly bonded to a lower surface of the upper optical sheet.

The laminated optical sheet module may further include an adhesive layer which is formed between the upper optical sheet and the lower optical sheet, so that an upward end of the second structural pattern is buried thereinto.

Further, shapes of cross-sections of the first unit light collector and the second unit light collector may be triangles.

The optical sheet module may further include a reflective polarizer which is disposed to be laminated with the lower optical sheet and the upper optical sheet to selectively transmit light in accordance with a polarization state of light transmitted from a lower portion.

The reflective polarizer may be laminated between the upper optical sheet and the lower optical sheet.

Further, the reflective polarizer may be laminated above the upper optical sheet.

Further, the second structural pattern may have the same cross-sectional shape and be formed to extend along a lateral direction.

Further, the upper optical sheet and the lower optical sheet may be disposed such that an extending direction of the first structural pattern and an extending direction of the second structural pattern intersect each other and the first structural pattern may perpendicularly intersect the second structural pattern.

According to another aspect of the present invention, there is provided a laminated optical sheet module, comprising: an upper optical sheet having a first structural pattern in which first light collectors whose cross-sectional areas decrease when progressing toward an upper portion, are continuously repeated; and a lower optical sheet laminated beneath the upper optical sheet and having a second structural pattern in which second unit light collectors whose cross-sectional areas thereof decrease when progressing toward an upper portion, are continuously repeated, in which the second unit light collector has the same cross-sectional shape as the first unit light collector and has a cross-sectional area which is relatively larger than that of the first unit light collector, so that a distance to an adjacent unit light collector is relatively long.

Advantageous Effects

The present invention has the following advantages in order to solve the above-mentioned problems.

In the optical sheet module in which an upper optical sheet having a first structural pattern and a lower optical sheet having a second structural pattern are laminated to be bonded, since the light concentrating region is reduced due to an inclined surface which is eliminated when a unit light collector formed on the lower optical sheet is bonded to the upper optical sheet, an inclined area is adjusted to reduce the reduction of the light concentrating region, so that the second structural pattern may maintain an inclined surface, other than a bonding area which maintains a predetermined strength at the time of bonding the upper optical sheet and the lower optical sheet, to have a predetermine size or larger.

The second structural pattern is configured by the light transmitting unit which refracts and concentrates light transmitted from the lower portion and a bonding unit which is formed to extend to an upper portion of the light transmitting unit, so that even when the upper optical sheet and the lower optical sheet are bonded, only a shape of the bonding unit is modified, thereby preventing the elimination of the light transmitting unit to increase brightness of light which is refracted and concentrated by the light transmitting unit.

BEST MODE

Figure 1:
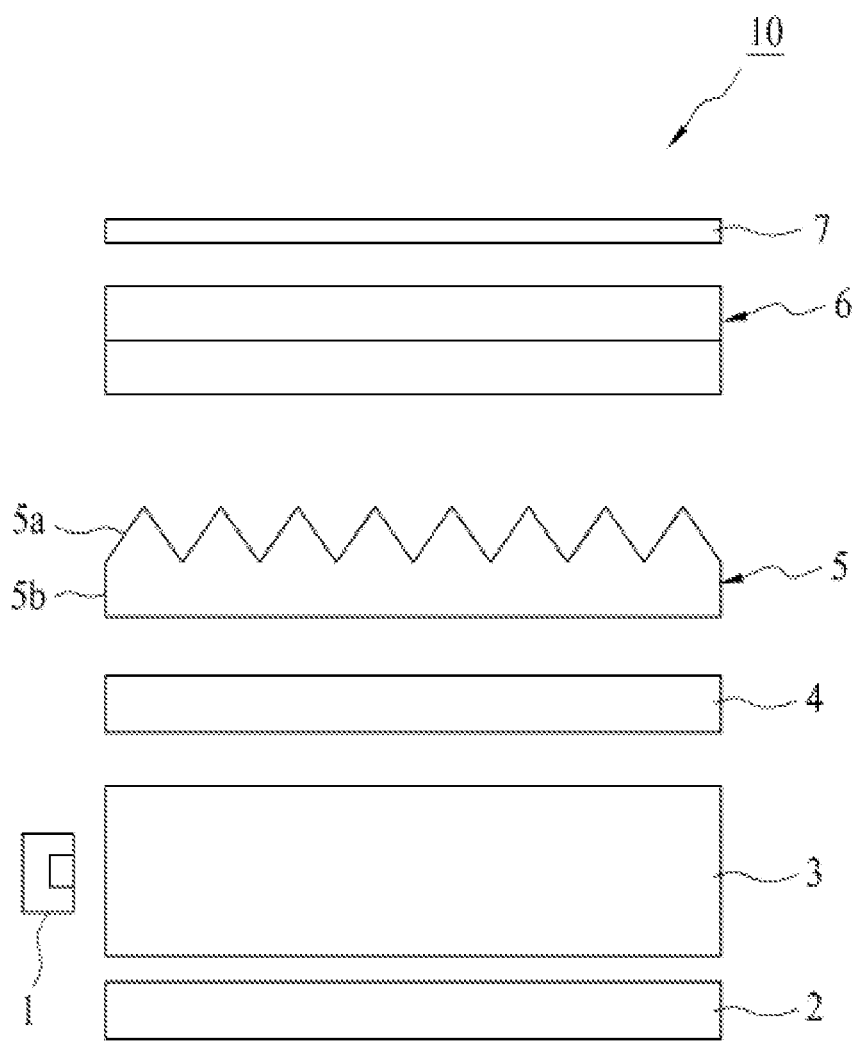
FIG. 1 is a view schematically illustrating a structure of a liquid crystal display device of the related art.

An exemplary embodiment of a laminated optical sheet module of the present invention configured as described above will be described with reference to accompanying drawings. However, this does not limit the present invention to a specific embodiment but provides clearer understanding of the present invention through the embodiment.

Further, in the description of the embodiment, the same name and same reference numeral denote the same component and redundant description thereof will be omitted.

A laminated optical sheet module according to an embodiment of the present invention may be applied to various fields which change a path of light and a shape which is applied to the liquid crystal display device will be described in the embodiment as an example.

First, a schematic construction of a liquid crystal display device according to an embodiment of the present invention will be described below with reference to FIG. 2.

Figure 2:
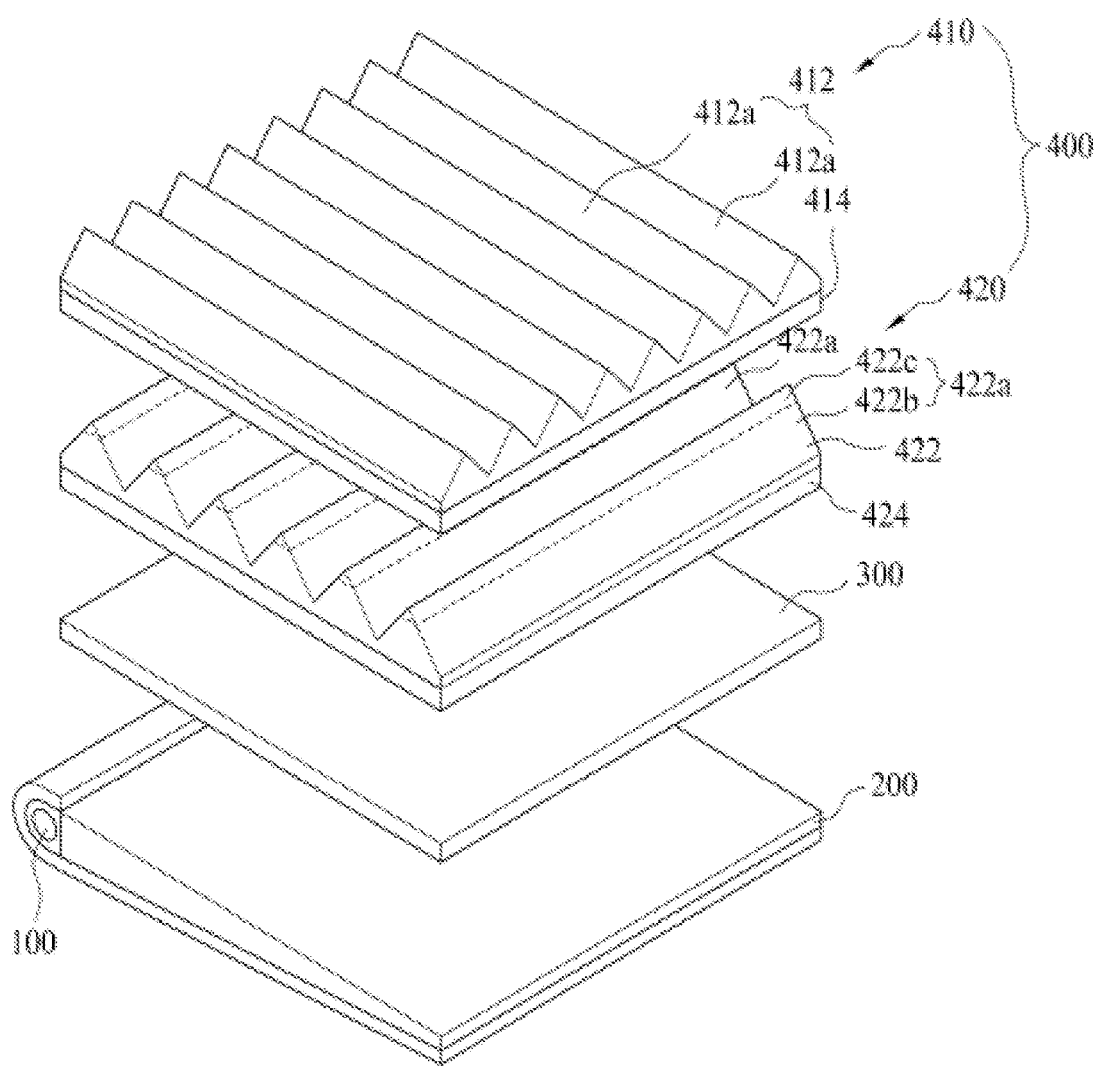
FIG. 2 is a view schematically illustrating a configuration of an optical sheet module according to an embodiment of the present invention.

FIG. 2 is an exploded perspective view illustrating a schematic configuration of a laminated optical sheet module according to an embodiment of the present invention.

As illustrated in the drawing, when a liquid crystal display device is configured, a backlight unit which supplies light to a liquid crystal panel needs to be necessarily provided. Such a backlight unit is mainly configured by a light source 100, a light guide plate 200, a diffuser sheet 300, and an optical sheet module 400.

The light source 100 is generally configured by a luminous body which emits light and emits light at a side of the light guide plate 200 and transmits the light toward the light guide plate 200.

The light guide plate 200 reflects and scatters the light which is emitted from the light source 100 and transmits the light toward the diffuser sheet 300. The diffuser sheet 300 is disposed above the light guide plate 200 and diffuses the light which is transmitted from the light guide plate 200 to uniformly diffuse the light and transmits the diffused light to the upper portion.

Further, the optical sheet module 400 is disposed above the diffuser sheet 300 to concentrate the transmitted light to upwardly move the light. The optical sheet module 400 is generally configured by a pair of an upper optical sheet 410 and a lower optical sheet 420.

The light is concentrated and refracted in a direction perpendicular to a plane of the optical sheet module 400 by structural patterns formed in the upper optical sheet 410 and the lower optical sheet 420 configured as described above.

According to a detailed configuration of the optical sheet module 400, the optical sheet module 400 is configured by the upper optical sheet 410 and the lower optical sheet 420.

The upper optical sheet 410 is mainly configured by a first base film 414 and a first structural pattern 412.

A light transmissive film which easily transmits light transmitted from a lower portion is generally used for the first base film 414 and the first structural pattern 412 which refracts and concentrates the light is formed on the first base film 414 to be integrated with the first base film 414.

The first structural pattern 412 is configured by a plurality of first unit light collectors 412a which has a cross-sectional trace which is inclined at a predetermined angle, is continuously repeated on an upper surface of the first base film 414, upwardly protrudes, and has an inclined surface having a cross-sectional area which decreases when progressing toward an upper portion.

The first unit light collector 412a refracts and concentrates light transmitted through the first base film 414 to transmit the light to the upper portion.

The upper optical sheet 410 configured as described above refracts and concentrates the light which is transmitted from the lower portion by using the first structural pattern 412 to emit the light toward the upper portion. Generally, a plurality of first structural pattern 412 is configured such that a plurality of first unit light collectors 412a forms a triangular prism and extends along one direction.

The lower optical sheet 420 is mainly configured by a second base film 424 and a second structural pattern 422 and is disposed below the upper optical sheet 410, so that the second structural pattern 422 is formed on an upper surface of the second base film 424.

Similarly to the first base film 414, the second base film 424 transmits the light transmitted from the diffuser sheet 300 which is disposed on a lower portion to transmit the light to an upper portion and has the second structural pattern 422 which is formed on an upper surface thereof.

Similarly to the first structural pattern 412, the second structural pattern 422 is formed such that a cross-sectional area decreases when progressing toward an upper portion, and is exposed to inside air to refract the light transmitted from the diffuser sheet 300 to transmit the light toward the upper portion.

The second structural pattern 422 is configured by a plurality of second unit light collectors 422a which is continuously repeated on a top surface of the second base film 424 and has an inclined surface having a cross-sectional area which decreases when progressing toward an upper portion.

However, the second light collector 422a is configured by a light transmitting unit 422b which has a cross-sectional surface which decreases when progressing toward an upper portion and a bonding unit 422c which is continuously connected to the light transmitting unit 422b to be disposed on an upper portion and is bonded to a lower surface of the first base film 414.

The light transmitting unit 422b is not bonded to the first base film 414 and a length of a cross-sectional trace thereof is not changed. The light transmitting unit 422b is exposed to internal air to refract the light transmitted from the diffuser sheet 300 to transmit the light toward the upper portion.

The bonding unit 422c is connected to an upper portion of the light transmitting unit and is in contact with a lower surface of the first base film 414 to serve as an adhesive so as to bond the upper optical sheet 410 and the lower optical sheet 420. Here, a shape of the bonding unit 422c may be modified when the bonding unit 422c is bonded to the first base film 414 and thus a height of the bonding unit 422c in a vertical direction may be modified.

The bonding unit 422c may be formed to have various shapes and in the present embodiment, the bonding unit 422c is formed to have the same inclined angle as the light transmitting unit 422b and extend to be upwardly inclined toward the upper portion, so that upper ends meet each other.

The second unit light collector 422a configured as described above has the same inclined angle as the first unit light collector 412a and the inclined surface of the second unit light collector 422a has a relatively larger surface area than the inclined surface of the first unit light collector 412a.

That is, a vertical distance between a lowermost portion and an uppermost portion of the second unit light collector 422a is longer than a vertical distance between a lowermost portion and an uppermost portion of the first unit light collector 412a and the inclined surface of the second unit light collector 422a has a relatively larger surface area than the inclined surface of the first unit light collector 412a.

In this case, the second unit light collector 422a has the same cross-sectional shape as the first unit light collector 412a and has a relatively larger cross-sectional area than that of the first unit light collector 412a, so that a distance to an adjacent unit light collector is relatively long.

However, as described above, the inclined surface of the second unit light collector 422a has a relatively larger surface area than the inclined surface of the first unit light collector 412a, but is not limited thereto.

A length of a cross-sectional trace of the light transmitting unit 422b may be equal to or larger than a length of a cross-sectional trace of the first unit light collector 412a.

The lower optical sheet 420 configured as described above is laminated between the diffuser sheet 300 and the upper optical sheet 410 to refract and concentrate light transmitted from the diffuser sheet 300 through the second structural pattern 422 and transmit the light to the upper optical sheet 410.

In the meantime, the first structural pattern 412 and the second structural pattern 422 are formed to have a triangular shape which upwardly obliquely extends toward the upper portion so that upper ends meet each other. Cross-sectional traces of the first structural pattern 412 and the second structural pattern 422 may be formed to be straight lines.

However, the illustrated shapes of the first structural pattern 412 and the second structural pattern 422 are not limited to specific shapes and are selected to easily understand a configuration according to an embodiment of the present invention.

Further, the first base film 414 and the second base film 424 may be formed of acryl or urethane and may be formed of a material having high light transmittance so as to transmit light transmitted from the diffuser sheet 300.

The upper optical sheet 410 and the lower optical sheet 420 configured as described above are attached such that the first structural pattern 412 and the second structural pattern 422 have the same cross-sectional area and extend along a lateral direction and an extending direction of the first structural pattern 412 and an extending direction of the second structural pattern 422 intersect along the lateral direction.

In this case, various angles may be applied as an intersecting angle of the first structural pattern 412 and the second structural pattern 422 and in this embodiment, the first structural pattern 412 and the second structural pattern 422 are attached at 90 degrees.

Next, structures of the first structural pattern 412 and the second structural pattern 422 will be described in more detail with reference to FIG. 3.

Figure 3:
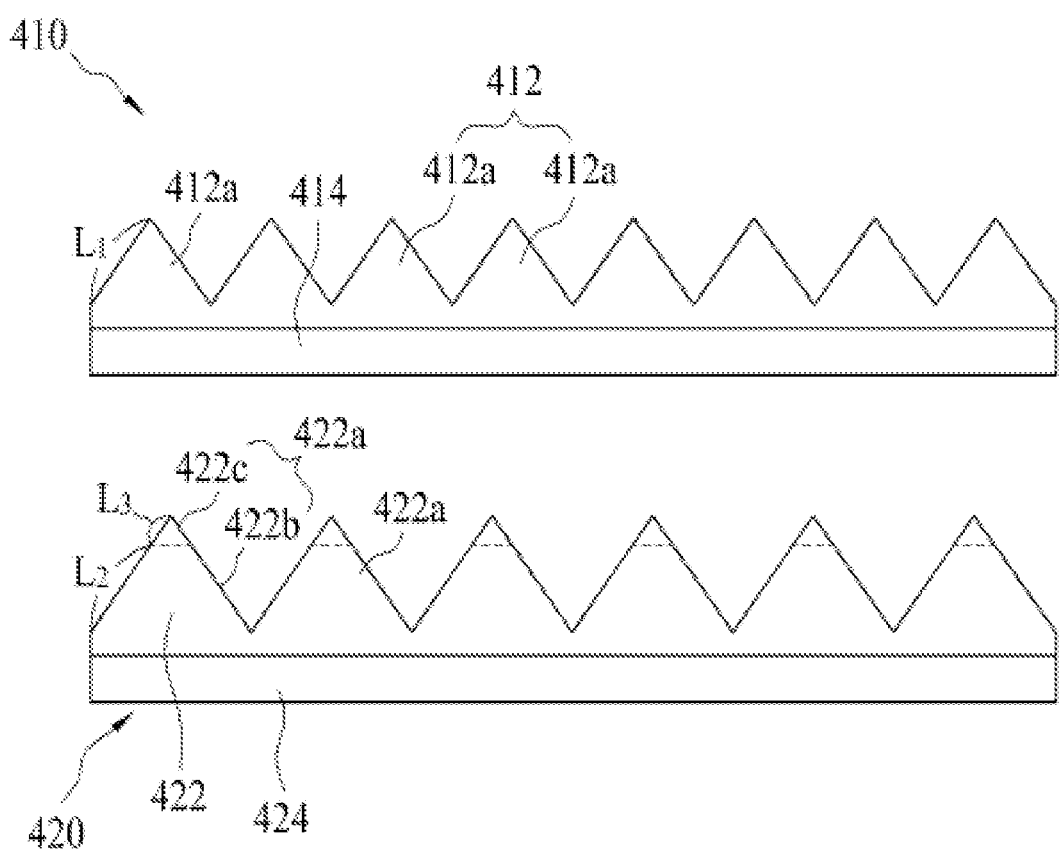
FIG. 3 is a view illustrating shapes of a first structural pattern and a second structural pattern in the optical sheet module of FIG. 2.

FIG. 3 is a view illustrating a shape of a second structural pattern in the optical sheet module 400 of FIG. 2.

As illustrated in the drawing, a state before bonding the upper optical sheet 410 and the lower optical sheet 420 is illustrated and the first structural pattern 412 has the first unit light collector 412a which vertically refracts and concentrates light transmitted from the lower portion.

The second structural pattern 422 has the second unit light collector 422a which refracts light transmitted from the lower portion and transmits the light to the upper optical sheet 410 and the second unit light collector 422a is configured by the light transmitting unit 422b and the bonding unit 422c which is connected to the upper portion of the light transmitting unit 422b to be bonded to a lower surface of the first base film 414.

When the bonding unit 422c is bonded to the lower surface of the first base film 414, the bonding unit 422c is not completely hardened but is bonded in a solid-liquid state. Therefore, a shape of the bonding unit 422c is modified during a process of being bonded to the lower surface of the first base film 414 and a bonded area of the bonding unit 422c with the first base film 414 is increased.

As described above, the bonding unit 422c of the second structural pattern 422 which is formed at an upward end is modified, so that an inclined surface which refracts the light is eliminated.

The length of the cross-sectional trace of the light transmitting unit 422b is equal to or larger than a length of the cross-sectional trace of the first unit light collector 412a, so that the light transmitting unit 422b has a cross-sectional trace which is equal to or larger than a predetermined length even when the inclined surface is eliminated when the second structural pattern 422 is bonded to the first base film 414. Therefore, the light transmitting unit 422b is configured such that a length of the cross-sectional trace of the light transmitting unit 422b which refracts the light transmitted from the lower portion is not changed.

Referring to the illustrated drawings, the length of the cross-sectional trace of the first unit light collector 412a is L1 and a length of the cross-sectional trace of the light transmitting unit 422b is L2. Here, lengths L1 and L2 are equal to each other.

Therefore, a length of the entire cross-sectional trace of the second structural pattern 422 is a length obtained by adding the length L2 of the cross-sectional trace of the light transmitting unit 422b and a length L3 of a cross-sectional trace of the bonding unit 422c and the length of the cross-sectional trace of the first structural pattern 412 is L1.

That is, since the lengths L1 and L2 are equal, the length of the cross-sectional trace of the second unit light collector 422a in the second structural pattern 422 is larger than the length of the cross-sectional trace of the first unit light collector 412a in the first structural pattern 412.

As described above, the length of the cross-sectional trace of the second unit light collector 422a is larger than the length of the cross-sectional trace of the first unit light collector 412a, so that the second structural pattern 422 maintains the inclined surface of the light transmitting unit 422b and prevents a light concentrating effect from being lowered even when the bonding unit 422c is eliminated by bonding the upper optical sheet 410 and the lower optical sheet 420.

In the meantime, when the first structural pattern 412 and the second structural pattern 422 are formed of the same material, the inclined angles of the first unit light collector 412a and the light transmitting unit 422b are same and thus a pitch of the second structure pattern 422 is larger than that of the first structural pattern 412 as a whole.

Next, a process where a shape of the bonding unit 422c is modified by the bonding of the upper optical sheet 410 and the lower optical sheet 420 will be described below with reference to FIG. 4.

Figure 4:
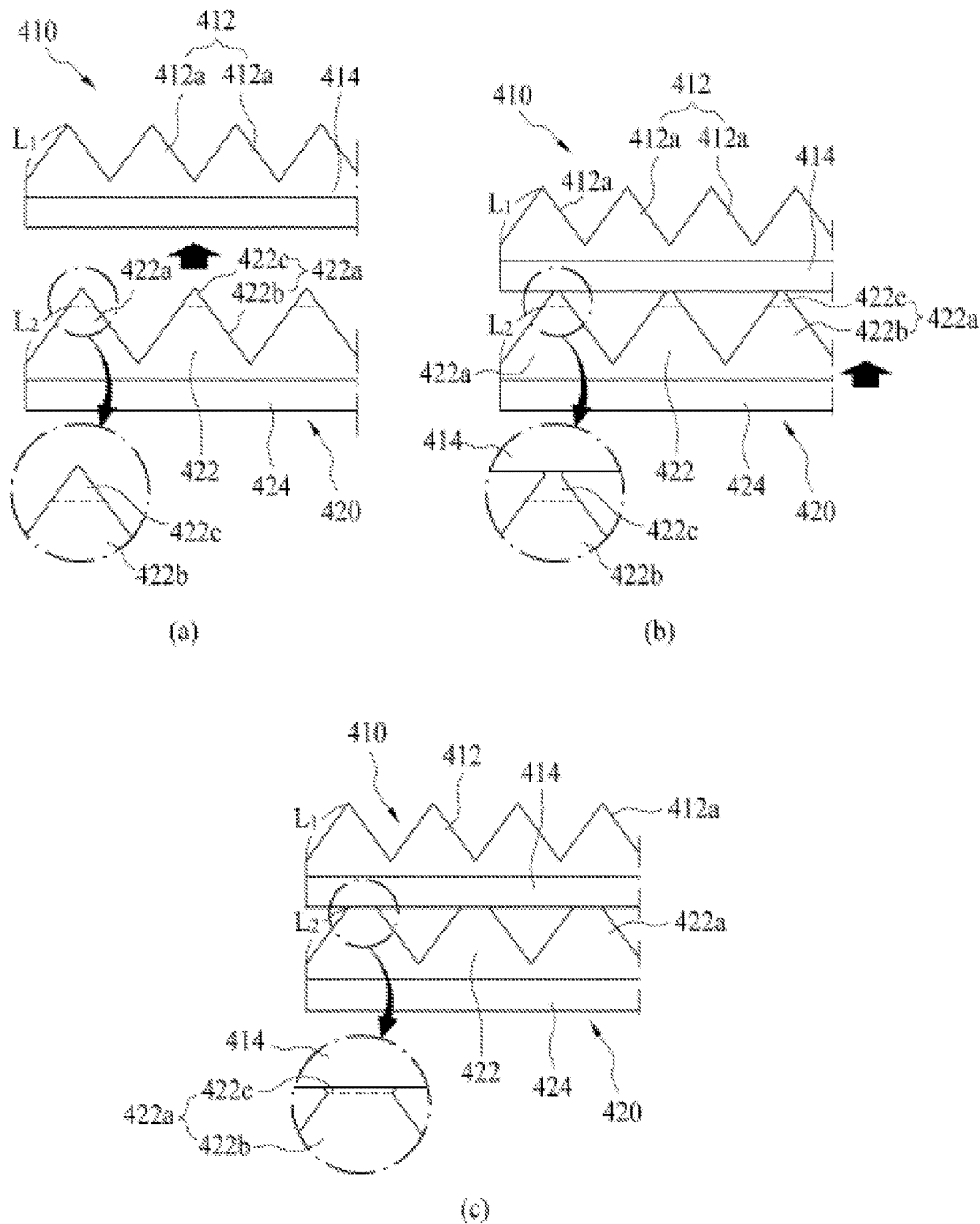
FIG. 4 is a view illustrating a state where a bonding unit is modified in a lower optical sheet of FIG. 2.

FIG. 4 is a view illustrating a state where the bonding unit 422c is modified in the lower optical sheet 420 of FIG. 2.

First, referring to FIG. 4A, in a state before the upper optical sheet 410 and the lower optical sheet 420 are bonded, the bonding unit 422c is maintained in an unmodified state in an upper portion of the light transmitting unit 422b in the second structural pattern 422.

Here, the lengths of the cross-sectional traces of the first unit light collector 412a and the light transmitting unit 422b are equal to each other. Therefore, since the lengths of the cross-sectional traces of the first unit light collector 412a and the light transmitting unit 422b are equal to each other, the length of the cross-sectional trace of the second structural pattern 422 is larger than the length of the cross-sectional trace of the first structural pattern 412.

Further, as the distance between the upper optical sheet 410 and the lower optical sheet 420 becomes short as illustrated in FIG. 4B, the bonding unit 422c becomes in contact with the lower surface of the first base film 414.

In this case, the bonding unit 422c maintains a solid-liquid state which is not completely hardened.

As described above, when the bonding unit 422c is in contact with the lower surface of the first base film 414, a shape of the upper portion of the bonding unit 422c is finely modified by external force which is vertically applied and the bonding unit 422c serves as an adhesive which bonds the first base film 414 and the light transmitting unit 422b to each other.

Here, since the upper optical sheet 410 and the lower optical sheet 420 are not completely bonded, the length of the cross-sectional trace of the second structural pattern 422 is larger than the length of the cross-sectional trace of the first structural pattern 412.

Next, referring to FIG. 4C, the upper optical sheet 410 and the lower optical sheet 420 are completely bonded, so that the shape of the bonding unit 422c is completely modified.

While the upper optical sheet 410 and the lower optical sheet 420 are continuously close to each other by the external force which is vertically applied, the bonding unit 422c is spread along the lower surface of the first base film 414 in a lateral direction and thus the length of the cross-sectional trace of the bonding unit 422c is gradually decreased.

As described above, the bonding unit 422c is spread and modified, so that the second structural pattern 422 and the first base film 414 are completely bonded.

Through this process, while the second structural pattern 422 is bonded to the lower surface of the first base film 414, the inclined surface of the bonding unit 422c is eliminated but the light transmitting unit 422b is not modified. Accordingly, the length of the cross-sectional trace of the light transmitting unit 422b is not changed and the inclined surface of the light transmitting unit 422b which refracts and concentrates light transmitted from the lower portion is maintained.

In the present embodiment, it is described that the first unit light collector 412a and the light transmitting unit 422b have the same cross-sectional trace length, but the first unit light collector 412a and the light transmitting unit 422b are not limited to specific shapes. Even though the upper optical sheet 410 and the lower optical sheet 420 are bonded, when the length of the cross-sectional trace of the light transmitting unit 422b which concentrates light in the second structural pattern 422 is not changed but only the bonding unit 422c is modified, any shapes may be applied.

As described above, in consideration that the inclined surface is eliminated when the second unit light collector 422a is bonded to the first base film 414, the second unit light collector 422a further includes the bonding unit 422c, thereby minimizing the reduction of the inclined surface of the light transmitting unit 422b due to the elimination of the inclined surface by being bonded to the first base film 414.

Figure 5:
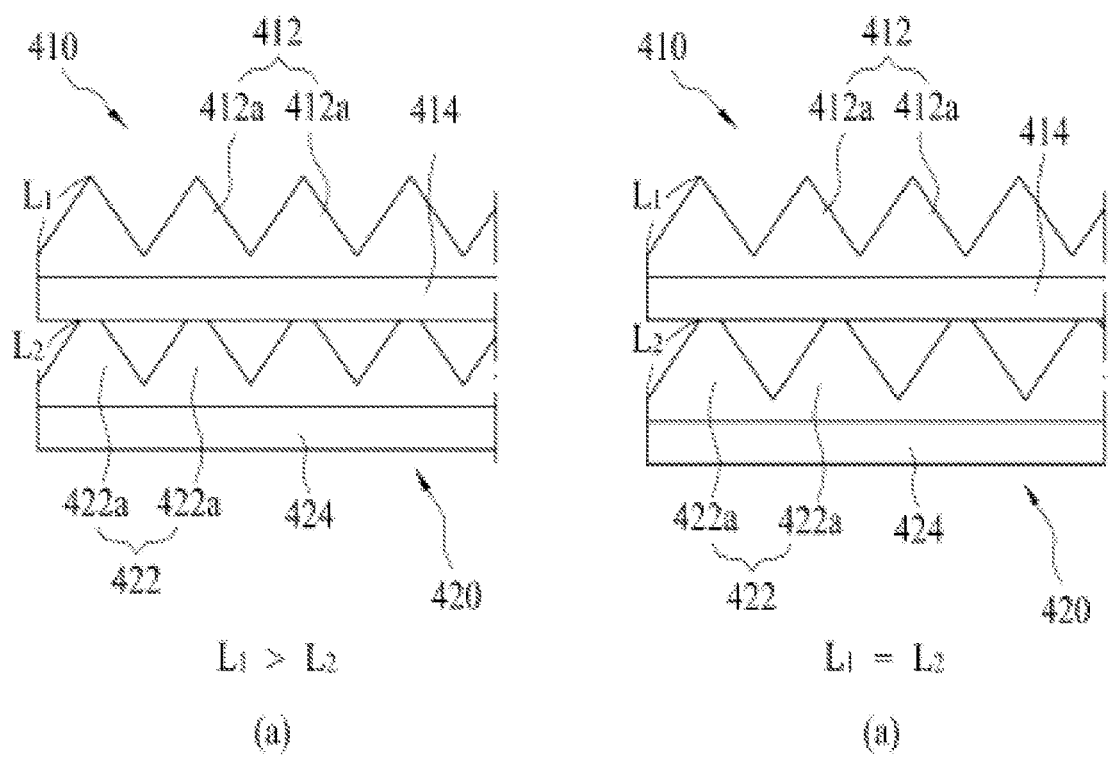
FIG. 5 is a view illustrating a difference of lengths of a light transmitting unit in a state where an upper optical sheet and a lower optical sheet are bonded depending on presence of the bonding unit of FIG. 2.

Next, lengths of the cross-sectional trace of the light transmitting unit 422b in the state where the upper optical sheet 410 and the lower optical sheet 420 are bonded, depending on the presence of the bonding unit 422c in the structural pattern 422 will be compared with reference to FIG. 5.

FIG. 5 is a view illustrating a difference of lengths of a light transmitting unit in a state where the upper optical sheet 410 and the lower optical sheet 420 are bonded depending on presence of the bonding unit 422c of FIG. 2.

First, as illustrated in FIG. 5A, the second structural pattern 422 is configured only by the light transmitting unit 422b without separately having the bonding unit 422c.

The second structural pattern 422 is configured only by the light transmitting unit 422b which has the same length of the cross-sectional trace as that of the first unit light collector 412a, so that when the second structural pattern 422 and the first base film 414 are bonded, a shape of the upward end of the light transmitting unit is modified and the inclined surface is eliminated. That is, the upward end of the light transmitting unit is spread along the lower surface of the first base film 414 and a length thereof is reduced.

As described above, when the upward end of the light transmitting unit 422b is eliminated, the length L2 of the cross-sectional trace of the light transmitting unit 422b becomes smaller than the length L1 of the cross-sectional trace of the first unit light collector 412a after the upper optical sheet 410 and the lower optical sheet 420 are bonded, and thus the inclined surface which concentrates light transmitted from the lower portion is reduced.

However, referring to FIG. 5B, the second structural pattern 422 is configured by the light transmitting unit 422b and the bonding unit 422c, so that the bonding unit 422c is modified and only the inclined surface of the light transmitting unit 422b remains after the bonding.

Here, when the second structural pattern 422 and the first base film 414 are bonded, the bonding unit 422c serves as an adhesive and is modified but no additional modification does not occur in the light transmitting unit 422b. Therefore, the length L2 of the cross-sectional trace of the light transmitting unit 422b is maintained to be equal to or larger than the length L1 of the cross-sectional trace of the first unit light collector 412a.

As described above, the bonding unit 422c is provided at the upward end of the second structural pattern 422, so that the elimination of the light transmitting unit 422b due to the bonding of the upper optical sheet 410 and the lower optical sheet 420 may be prevented.

That is, when the second structural pattern 422 is formed, the bonding unit 422c is further included in the upper portion in consideration of a size eliminated through a bonding process with the first base film 414, so that the inclined surface of the light transmitting unit 422b is maintained, thereby increasing brightness of concentrated light.

Next, a configuration of an optical sheet module 400 according to an embodiment of the present invention which further includes a separate adhesive layer 430 will be described with reference to FIGS. 6 and 7.

Figure 6:
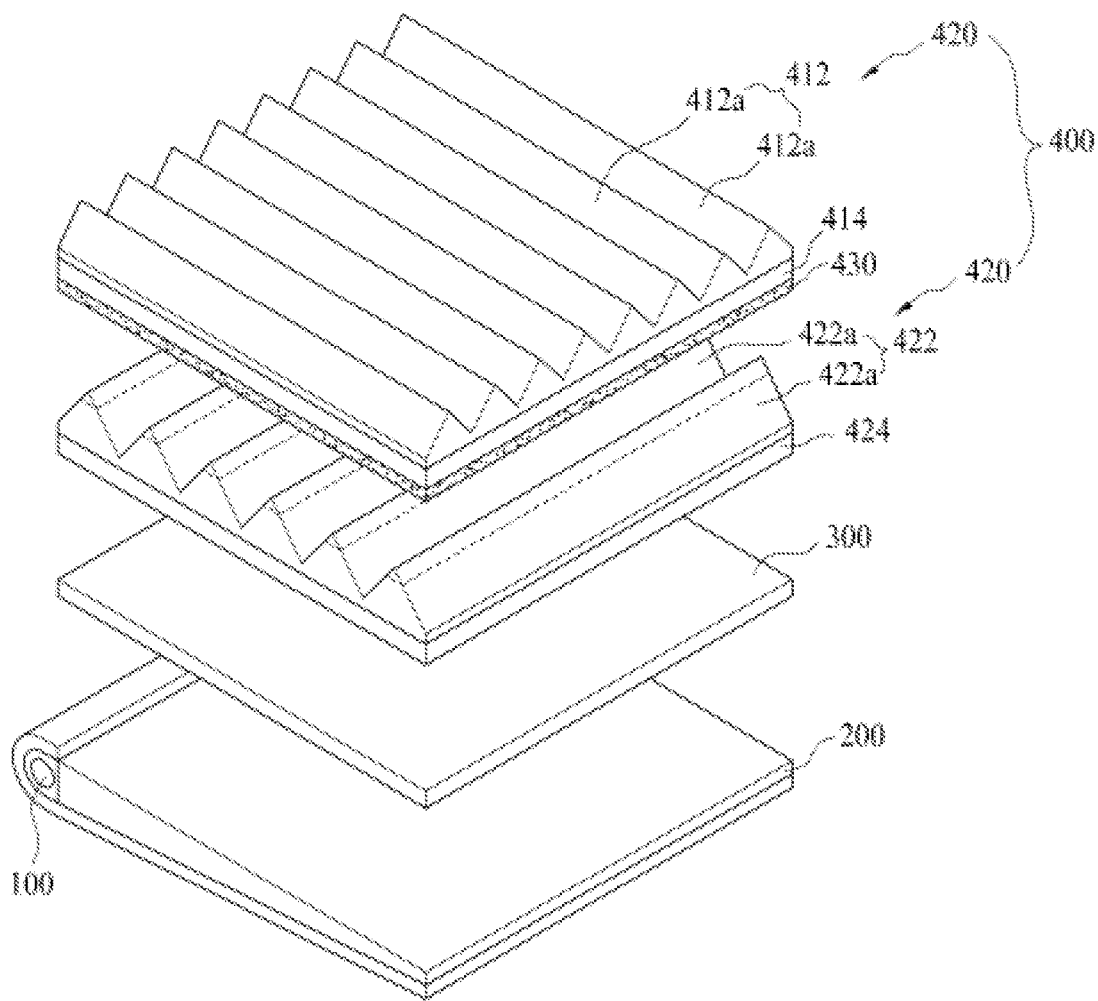
FIG. 6 is a view illustrating a configuration of the optical sheet module of FIG. 2 which further includes a separate adhesive layer.
Figure 7:
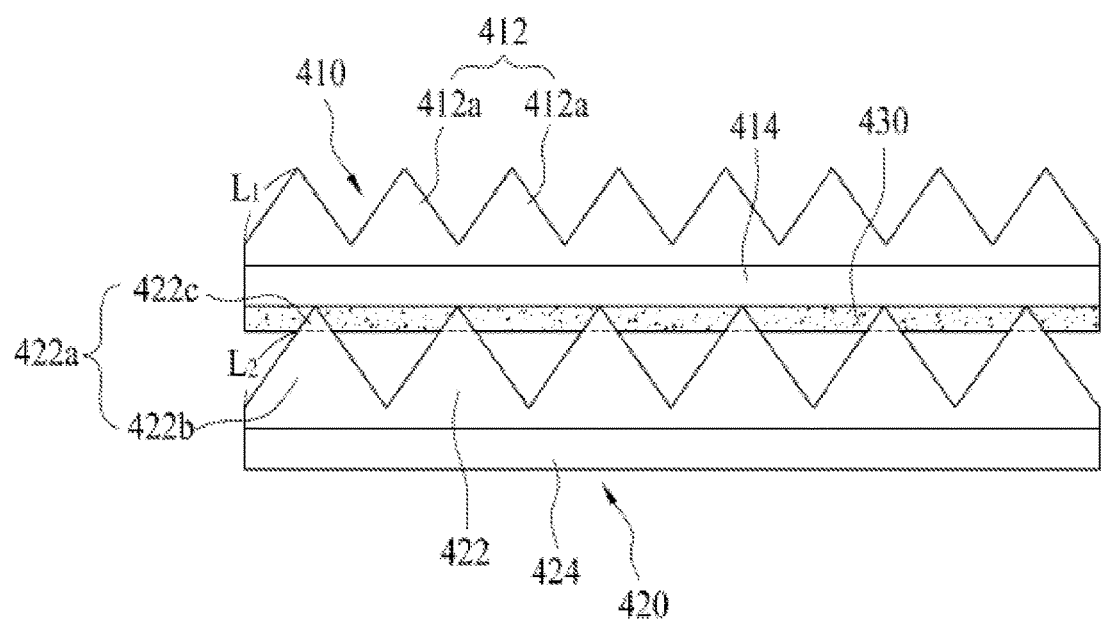
FIG. 7 is a view illustrating a state where the bonding unit is buried in the adhesive layer of FIG. 6.

FIG. 6 is a view illustrating a configuration of an optical sheet module 400 of FIG. 2 which further includes a separate adhesive layer 430 and FIG. 7 is a view illustrating a state where the bonding unit 422c is buried in the adhesive layer 430 of FIG. 6.

As illustrated in FIG. 6, the basic configuration is the same, but a separate adhesive layer 430 is further provided between the upper optical sheet 410 and the lower optical sheet 420 in the optical sheet module 400.

The optical sheet module 400 is configured to include the upper optical sheet 410 and the lower optical sheet 420, and a separate adhesive layer 430.

The adhesive layer 430 is provided below the upper optical sheet to attach the lower optical sheet and the upper optical sheet. In this case, the adhesive layer 430 may be formed of a material having high light transmittance so as to transmit light transmitted from the diffuser sheet 300.

As described above, the optical sheet module 400 is configured to further include the adhesive layer 430, so that when the second structural pattern 422 and the first base film 414 are bonded, the bonding unit 422c does not serve as an adhesive but is buried into the adhesive layer 430.

That is, the adhesive layer 430 is located on the lower surface of the first base film 414, so that the bonding unit 422c is buried into the adhesive layer 430 on the lower surface of the first base film 414 but the shape thereof is not changed.

Further, the bonding unit 422c is buried into the adhesive layer 430, so that a bonded area is increased and thus an adhesive quality of the upper optical sheet 410 and the lower optical sheet 420 is increased.

As described above, when the bonding unit 422c is buried into the adhesive layer 430, as illustrated in FIG. 7, the light transmitting unit 422b is not buried into the adhesive layer 430, so that the length L2 of the light transmitting unit 422b may be maintained to be equal to or larger than the length L1 of the first unit light collector 412a.

With this configuration, the optical sheet module 400 further includes the adhesive layer 430 and the bonding unit 422c is buried into the adhesive layer 430 to increase the adhesive quality and the length of the cross-sectional trace of the light transmitting unit 422b is not changed, so that the brightness of light which is refracted and concentrated by the second structural pattern 422 is not lowered.

Next, a modified shape of the bonding unit 422c will be described with reference to FIGS. 8 and 9.

Figure 8:
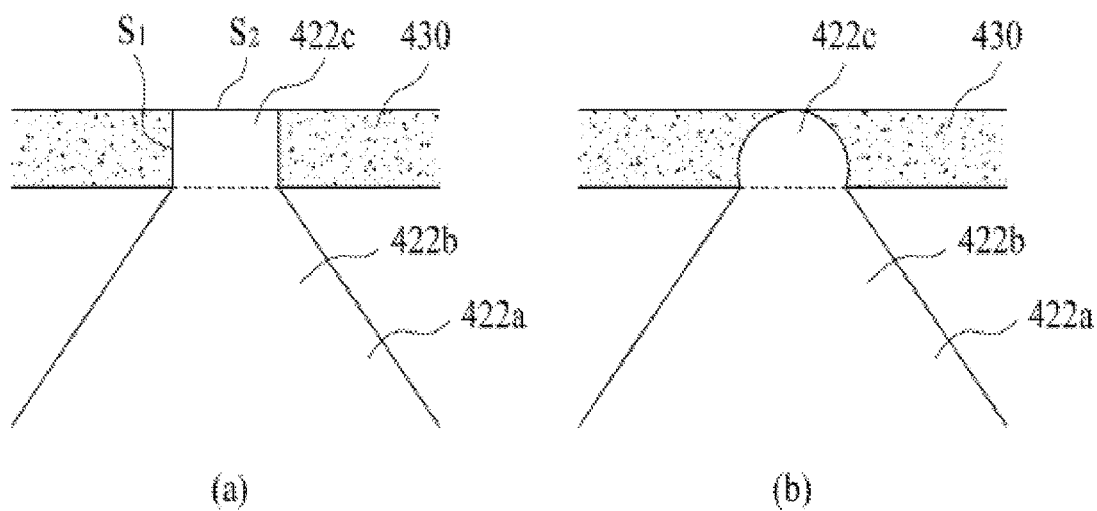
FIG. 8 is a view illustrating a modified shape of the bonding unit in the lower optical sheet of FIG. 6.
Figure 9:
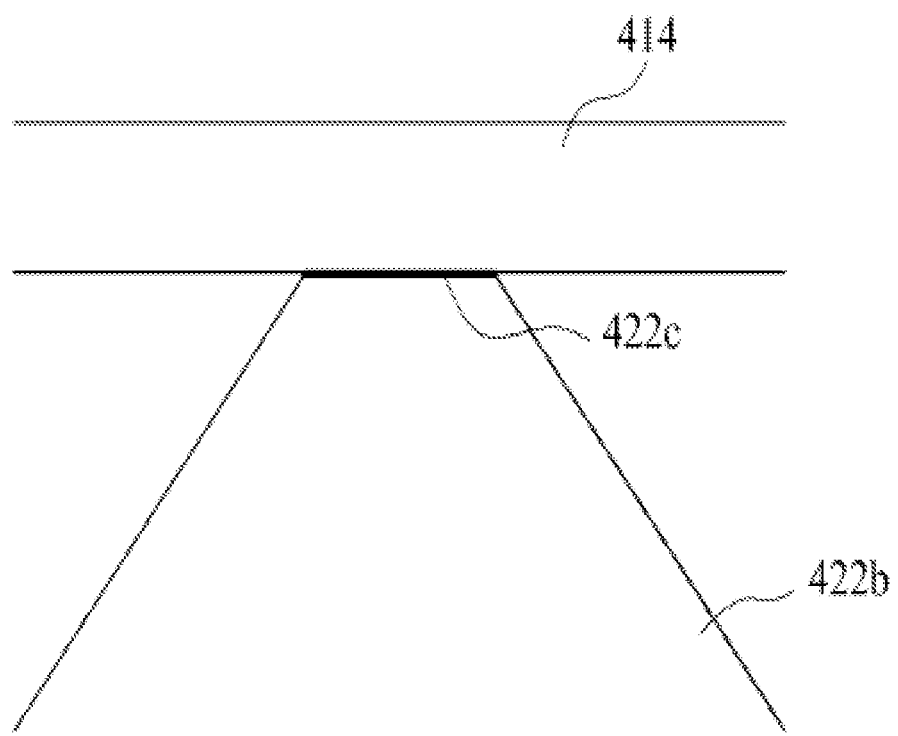
FIG. 9 is a view illustrating a configuration in which the bonding unit is formed to be an extending surface in the lower optical sheet of FIG. 2.

FIG. 8 is a view illustrating a modified shape of the bonding unit 422c in the lower optical sheet 420 of FIG. 6 and FIG. 9 is a view illustrating a configuration in which the bonding unit is formed to be an extending surface in the lower optical sheet of FIG. 2.

As illustrated in the drawing, the bonding unit 422c is not formed to have a cross-sectional trace which has the same inclined angle as the light transmitting unit 422b but may be formed to have various shapes.

Referring to FIG. 8A, an upper end of the bonding unit 422c along the cross-sectional trace has a bonded surface which is in contact with a lower surface of the first base film 414 to be in area-contact with each other.

The bonding unit 422c has a pair of extending surfaces S1 which are connected to the upper portion of the light transmitting unit 422b to upwardly extend and a bonded surface S2 which connects between the extending surfaces S1.

As described above, the bonding unit 422c includes the extending surfaces S1 and the bonded surface S2, so that the adhesive quality of the first base film 414 and the second structural pattern 422 may be increased.

Referring to FIG. 8B, the bonding unit 422c is formed to have a upwardly protruding spherical shape to increase a bonded area, so that the adhesive quality of the first base film 414 and the second structural pattern 422 may be increased.

That is, the bonded surface S2 is formed to have a curved cross-sectional trace and upwardly protrudes.

As described above, the bonding unit 422c is formed, so that a bonded area of the bonding unit 422c which is buried into the adhesive layer 430 is increased, thereby increasing the adhesive quality. Further, when the optical sheet module 400 does not include the adhesive layer 430, the bonding unit 422c is spread onto the lower surface of the first base film 414 as described above with reference to FIG. 4, to serve as an adhesive.

As described above, the modified shape of the bonding unit 422c has been described and when the second structural pattern 422 is bonded to the first base film 414 regardless of the presence of the adhesive layer 430, the light transmitting unit 422b is configured such that the length of the cross-sectional trace is not changed by the bonding unit 422c. Therefore, the region of the second structural pattern 422 which refracts and concentrates the light transmitted from the lower portion is not eliminated, so that the brightness of the concentrated light is increased.

Next, a modified shape of the bonding unit 422c illustrated in FIG. 9 will be described. The bonding unit 422c is formed as a connecting surface which connects the upward end of the cross-sectional trace of the light transmitting unit 422b. Here, the second unit light collector 422a may be formed to have an inclined surface which is equal to or larger than that of the first unit light collector 412a.

Therefore, the bonding unit 422c which is formed as the connecting surface is in contact with the lower portion of the upper optical sheet 410 to be bonded.

Next, a configuration of an optical sheet module according to an embodiment of the present invention which further includes a separate reflective polarizer will be described with reference to FIGS. 10 and 11.

Figure 10:
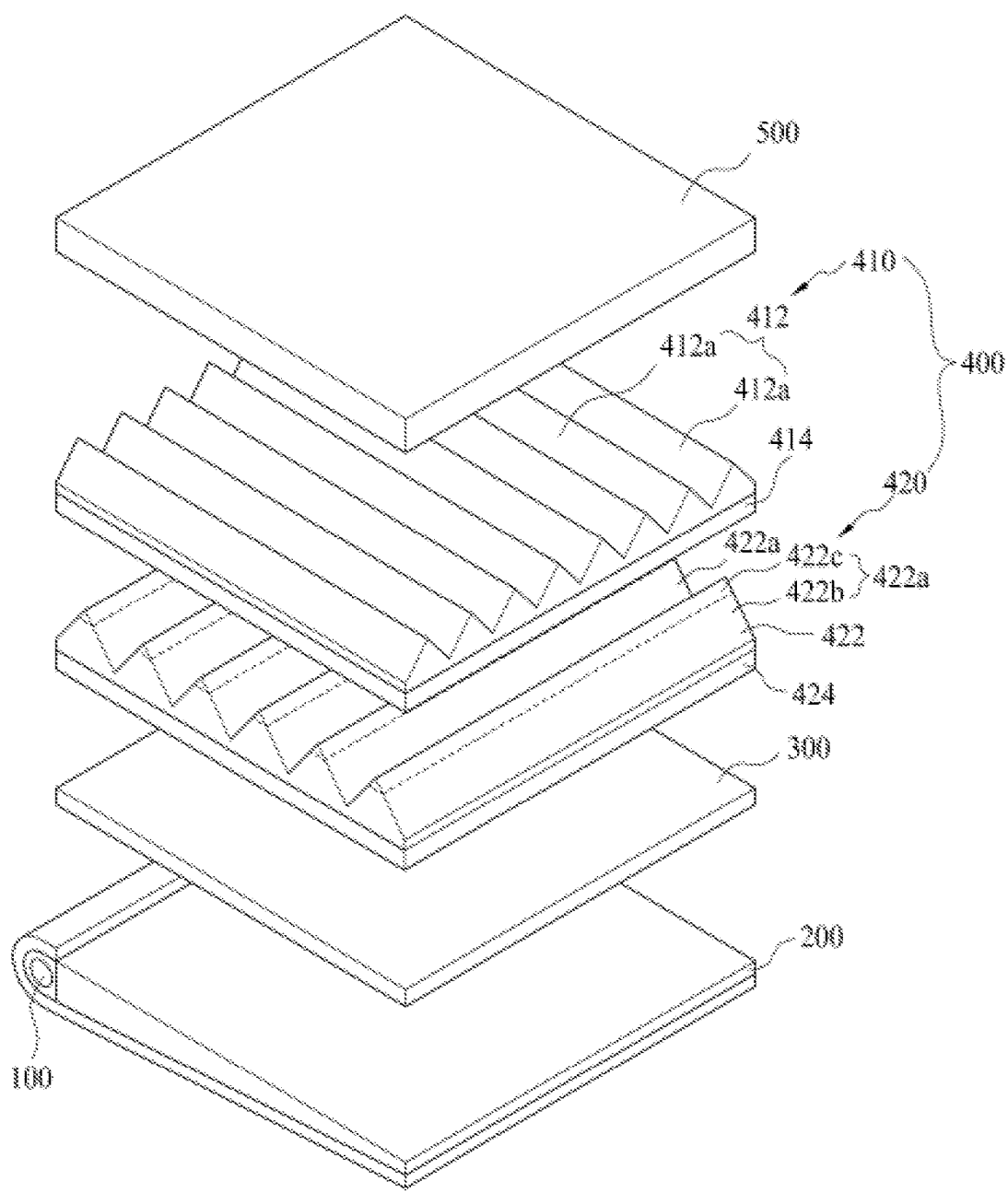
FIG. 10 is an exploded perspective view illustrating a state of the optical sheet module of FIG. 2 which further includes a reflective polarizer.
Figure 11:
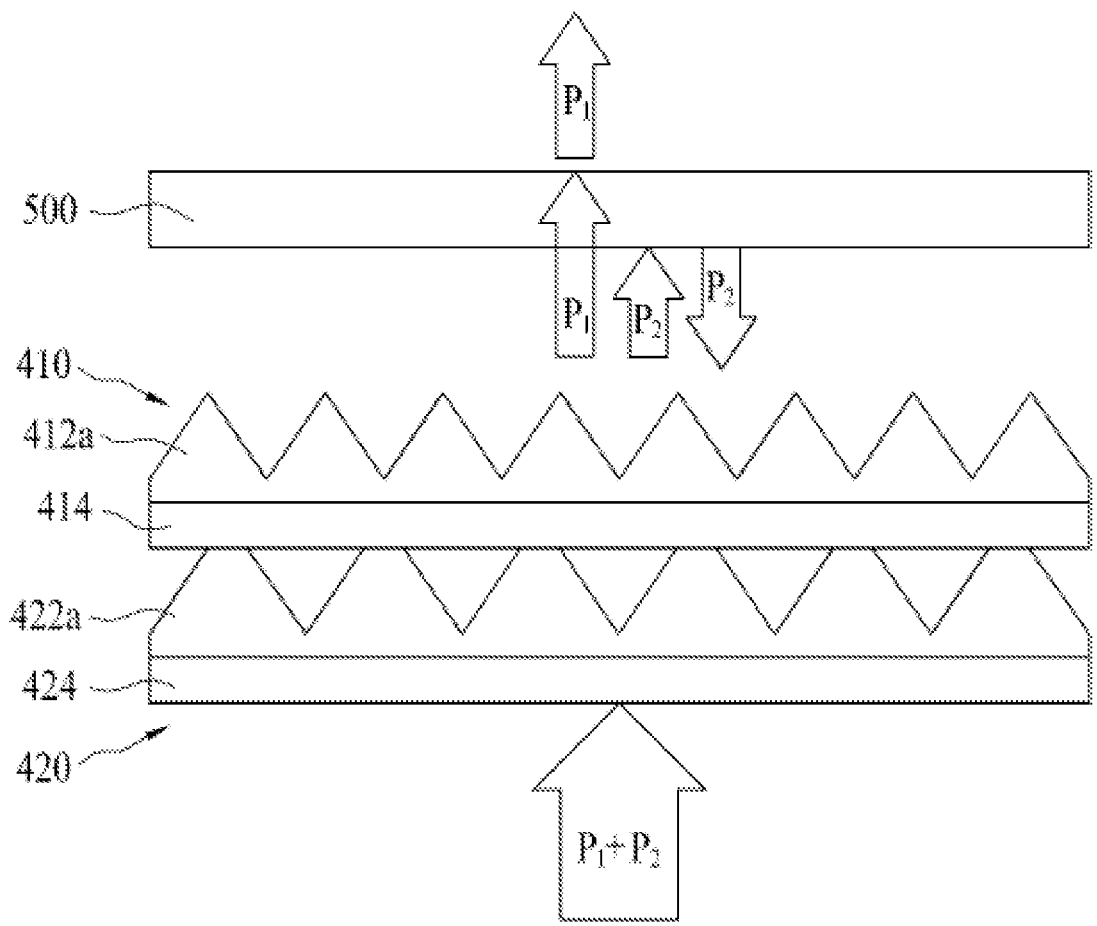
FIG. 11 is a view illustrating a state where light is transmitted or reflected by the reflective polarizer of FIG. 10.

FIG. 10 is an exploded perspective view illustrating a state of the optical sheet module of FIG. 2 which further includes a reflective polarizer and FIG. 11 is a view illustrating a state where light is transmitted or reflected by the reflective polarizer of FIG. 10.

Referring to the drawings, a separate reflective polarizer 500 is further included in the upper portion of the upper optical sheet 410 to be laminated thereon, so that the light concentrated by the upper optical sheet 410 and the lower optical sheet 420 is selectively transmitted.

The reflective polarizer 500 serves to selectively transmit light in accordance with the polarization state of the light and return light having a different polarization state to the light guide plate 200. An example of the above device is a dual brightness enhancement film (DBEF).

The light which does not pass through the DBEF but is reflected is re-reflected by the light guide plate 200 below the BLU to be directed to the upper portion again. The DBEF continuously and repeatedly serves to pass through only light having a proper polarization state among the light and reflect the remaining light.

By repeating the above process, only light having a desired polarization state is upwardly emitted, so that loss of the emitted light is reduced and brightness of a display module is increased.

More specifically, as illustrated in FIG. 11, the reflective polarizer 500 is laminated on the upper optical sheet 410, so that the light which passes through the lower optical sheet 420 and the upper optical sheet 410 to be concentered is directed to the reflective polarizer 500. In the light directed to the reflective polarizer 500, light having various polarization states is mixed and light of P1 having a polarization state which is transmitted by the reflective polarizer 500 and light of P2 having a polarization state which is not transmitted by the reflective polarizer 500 are included.

As illustrated in the drawing, the light which transmits the upper optical sheet 410 and the lower optical sheet 420 is in a mixed state of P1 and P2 but the reflective polarizer 500 transmits only light of P1 but downwardly reflects the light of P2 again.

Therefore, the light of P1 is emitted to the outside but the light of P2 is reflected to return to the lower portion and then reflected by the light guide plate 200 to move to the upper portion again. By this process, a progress direction and the polarization state of the light of P2 are changed and through the repetition thereof, the light is converted to be appropriately transmitted by the reflective polarizer 500.

As described above, the reflective polarizer 500 is provided, so that loss of light is reduced and light having a desired refracting angle and a desired polarization state is emitted to the upper portion, thereby increasing brightness of the display module.

In the meantime, the reflective polarizer 500 may be laminated on the upper optical sheet 410 and also laminated between the upper optical sheet 410 and the lower optical sheet 420.

Although the exemplary embodiments of the present invention have been described above, the present invention may be embodied in other ways in addition to the above-described embodiments without departing from the gist or the scope of the present invention. Therefore, it should be understood that the embodiment is not limited to a specific example but is illustrative and thus the present invention is not limited to the above-described embodiment but may be modified within the scope of the accompanying claims and the equivalent range.

The invention claimed is:

1. A laminated optical sheet module, comprising:
    an upper optical sheet having a first structural pattern in which first unit light collectors having an inclined surface, a cross-sectional area of which decreases when progressing toward an upper portion, are continuously repeated; and
    a lower optical sheet laminated beneath the upper optical sheet and having a second structural pattern in which second unit light collectors having an inclined surface, a cross-sectional area of which decreases when progressing toward an upper portion, are continuously repeated,
    wherein a vertical distance between a lowermost portion and an uppermost portion of the second unit light collector is longer than a vertical distance between a lowermost portion and an uppermost portion of the first unit light collector and a surface area of the inclined surface of the second unit light collector is larger than a surface area of the inclined surface of the first unit light collector,
    wherein all of the second unit light collectors of the second structural pattern have a same distance between the lowermost portion and the uppermost portion of the second unit light collectors and all of the inclined surfaces of the second unit light collectors of the second structural pattern have a same surface area,
    wherein an inclined angle of a cross-sectional trace of the second unit light collector is the same as an inclined angle of a cross-sectional trace of the first unit light collector,
    wherein the second unit light collector includes a light transmitting unit which concentrates incident light and transmits the light to an upper portion; and a bonding unit which is connected to the upper portion of the light transmitting unit and is bonded to the upper optical sheet, and a length of a cross-sectional trace of the light transmitting unit of the second unit light collector is equal to or larger than a length of a cross-sectional trace of the first unit light collector,
    wherein a portion of the bonding unit is squished during a process of bonding the second unit light collector and the upper optical sheet, thereby spreading on a lower surface of the upper optical sheet and the light transmitting unit is bonded to the upper optical sheet while maintaining the length of the cross-sectional trace without modifying the shape thereof.

2. The laminated optical sheet module of claim 1, the bonding unit is configured to include a pair of extending surfaces upwardly extending from an upper portion of the light transmitting unit and a bonded surface whose both sides are connected to the pair of extending surfaces to be bonded to the upper optical sheet.

3. The laminated optical sheet module of claim 2, wherein the bonded surface is formed to have a curved cross-sectional trace.

4. The laminated optical sheet module of claim 1, wherein the bonding unit is formed to be a connecting surface connecting an upward end of the cross-sectional trace of the light transmitting unit.

5. The laminated optical sheet module of claim 1, wherein an upward end of the second structural pattern is directly bonded to the lower surface of the upper optical sheet.

6. The laminated optical sheet module of claim 1, further comprising:
    an adhesive layer which is formed between the upper optical sheet and the lower optical sheet, so that an upward end of the second structural pattern is buried thereinto.

7. The laminated optical sheet module of claim 1, wherein shapes of cross-sections of the first unit light collector and the second unit light collector are triangles.

8. The laminated optical sheet module of claim 1, further comprising:
    a reflective polarizer which is disposed to be laminated with the lower optical sheet and the upper optical sheet to selectively transmit light in accordance with a polarization state of light transmitted from a lower portion.

9. The laminated optical sheet module of claim 8, wherein the reflective polarizer is laminated between the upper optical sheet and the lower optical sheet.

10. The laminated optical sheet module of claim 8, wherein the reflective polarizer is laminated above the upper optical sheet.

11. The laminated optical sheet module of claim 1, wherein the second structural pattern includes a plurality of the second unit light collectors and each of the second unit light collectors has all the same cross-sectional shape and is formed to extend along a lateral direction.

12. The laminated optical sheet module of claim 1, wherein the upper optical sheet and the lower optical sheet are disposed such that an extension direction of the first structural pattern and an extension direction of the second structural pattern intersect each other when viewed toward a direction of the lower optical sheet from the upper optical sheet.

13. The laminated optical sheet module of claim 12, wherein the first structural pattern perpendicularly intersects the second structural pattern.

* * * * *